(12) United States Patent
Lee et al.

(10) Patent No.: US 8,193,507 B2
(45) Date of Patent: Jun. 5, 2012

(54) SYSTEM AND METHOD FOR COMPENSATING FOR ANODE GAIN NON-UNIFORMITY IN MULTI-ANODE POSITION SENSITIVE PHOTOMULTIPLIER TUBE

(75) Inventors: Jae Sung Lee, Seoul (KR); Chan Mi Lee, Seoul (KR); Sun Il Kwon, Seoul (KR); Mikiko Ito, Seoul (KR); Hyun Suk Yoon, Seoul (KR); Sang Keun Park, Seoul (KR); Seong Jong Hong, Seoul (KR); Dong Soo Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 189 days.

(21) Appl. No.: 12/791,988

(22) Filed: Jun. 2, 2010

(65) Prior Publication Data

US 2011/0192980 A1    Aug. 11, 2011

(30) Foreign Application Priority Data

Feb. 9, 2010    (KR) .................. 10-2010-0011816

(51) Int. Cl.
*G01T 1/208*    (2006.01)

(52) U.S. Cl. .................... 250/363.07; 250/362; 250/369

(58) Field of Classification Search ............... 250/252.1, 250/362, 363.07, 369

See application file for complete search history.

(56) References Cited

U.S. PATENT DOCUMENTS 5,585,637 A * 12/1996 Bertelsen et al. ......... 250/363.03
5,608,221 A * 3/1997 Bertelsen et al. ......... 250/363.03

* cited by examiner

*Primary Examiner* — David Porta
*Assistant Examiner* — Marcus Taningco
(74) *Attorney, Agent, or Firm* — Hiscock & Barclay, LLP (57) ABSTRACT

The present invention relates to a system and method for compensating for anode gain non-uniformity in a Multi-anode Position Sensitive Photomultiplier Tube (PS-PMT), in which a compensation unit is disposed between the multi-anode position sensitive photomultiplier tube and a position detection circuit unit and configured to uniform a current signal inputted to the position detection circuit unit, thereby compensating for anode gain non-uniformity. In accordance with the present invention, the compensation unit for changing resistance is used. Accordingly, there is an advantage in that the gain non-uniformity of each of the anodes of the PS-PMT can be compensated for. Furthermore, the gain non-uniformity of each of the anodes of the PS-PMT is compensated for by changing resistance values of the variable resistances of the compensation unit. Accordingly, there is an advantage in that the interaction positions of gamma rays can be calculated more precisely.

17 Claims, 8 Drawing Sheets

| Unit [kΩ] | | | | | | | |
|---|---|---|---|---|---|---|---|
| 41.282 | 50.117 | 58.071 | 66.695 | 64.309 | 66.587 | 51.477 | 51.195 |
| 59.446 | 59.776 | 69.233 | 75.313 | 75.323 | 75.192 | 64.019 | 66.025 |
| 61.476 | 61.839 | 72.132 | 91.714 | 91.724 | 72.142 | 74.960 | 71.424 |
| 44.090 | 54.514 | 66.723 | 110.627 | 119.009 | 78.765 | 66.456 | 66.040 |
| 42.178 | 48.863 | 75.310 | 110.649 | 110.671 | 82.600 | 75.001 | 74.512 |
| 43.112 | 47.640 | 64.301 | 110.458 | 82.676 | 69.295 | 64.051 | 101.987 |
| 48.566 | 51.502 | 72.104 | 97.078 | 75.362 | 62.067 | 71.843 | 90.588 |
| 54.178 | 56.146 | 96.975 | 300.000 | 82.710 | 96.993 | 61.851 | 66.037 |

D1 (top-left), A1 (top-right), C1 (bottom-left), B1 (bottom-right)

SYSTEM AND METHOD FOR COMPENSATING FOR ANODE GAIN NON-UNIFORMITY IN MULTI-ANODE POSITION SENSITIVE PHOTOMULTIPLIER TUBE

CROSS-REFERENCE TO RELATED APPLICATIONS

This application claims priority to Korean Patent Application Number 10-2010-011816 filed Feb. 9, 2010, the entire disclosure of which is hereby incorporated by reference.

BACKGROUND OF THE INVENTION

1. Field of the Invention

The present invention relates to a system and method for compensating for anode gain non-uniformity in a multi-anode position sensitive photomultiplier tube, and more particularly, to a system and method for compensating for anode gain non-uniformity in a multi-anode position sensitive photomultiplier tube, in which a compensation unit is disposed between the multi-anode position sensitive photomultiplier tube and a position detection circuit unit and configured to uniform a current signal inputted to the position detection circuit unit, thereby compensating for anode gain non-uniformity.

2. Background of the Related Art

A nuclear medicine imaging apparatus is widely used for a variety of diagnosis and medical treatments, such as an examination of energy metabolism and a neuron receptor system by imaging the distribution of radiopharmaceuticals within the body. Representative nuclear medicine equipments, such as a gamma camera, a Single Photon Emission Computed Tomography (SPECT) apparatus, and a Positron Emission Tomography (PET) apparatus, are based on a scheme for converting photons, generated through the interaction of gamma rays and scintillation crystals, into electrical signals and then imaging a gamma-ray interaction position using electronic circuits and a computer program. Here, a device for converting weak light, generated within the scintillation crystals, into electrons, amplifying the electrons, and outputting the amplified electrons as a signal is a photomultiplier tube.

The photomultiplier tube can have various forms from a cylinder form to a quadrangle form. From among them, a Multi-anode Position Sensitive Photomultiplier Tube (PS-PMT) has a wide effective area because it has several tens to several hundreds of anodes arranged with the high integration. Thus, the PS-PMT is advantageous for image devices using scintillation crystals of a small cross section. In the PS-PMT, however, the anodes have different gains for a uniformly incident light source, respectively. Consequently, a distortion can occur in determining a gamma-ray interaction position because of such gain non-uniformity.

Accordingly, in order to increase accuracy in detecting gamma rays interaction positions, there is a need for compensating for anode-based (or channel-based) gain non-uniformity in the PS-PMT.

SUMMARY OF THE INVENTION

Accordingly, the present invention has been made in view of the above problems occurring in the prior art, and it is an object of the present invention to provide a system and method for compensating for the gain non-uniformity of a Multi-anode Position Sensitive Photomultiplier Tube (PS-PMT), which is capable of compensating for the gain non-uniformity of each of the anodes of the PS-PMT using a compensation unit for changing resistance.

It is another object of the present invention to provide a system and method for compensating for the gain non-uniformity of the PS-PMT, which is capable of compensating for the gain non-uniformity of each of the anodes of the PS-PMT by changing resistance values of the variable resistors of a compensation unit and more precisely calculating the interaction positions of gamma rays.

To achieve the above objects, a system for compensating for a gain non-uniformity of a Multi-anode Position Sensitive Photomultiplier Tube (PS-PMT) according to an aspect of the present invention comprises the PS-PMT 200 configured to convert scintillation, generated by gamma rays incident to specific scintillation crystals 100, into electrons, amplify the electrons on a channel basis, and output current signals through a number of respective channels; a position detection circuit unit 300 configured to compress the outputted current signals into four current signals and dividedly output the four current signals in order to display gamma-ray interaction positions on the scintillation crystals 100 in a form of a 2-dimensional energy distribution based on the outputted current signals; a compensation unit 400 configured to comprise a serial variable resistor 410 and a parallel variable resistor 420, connected between an output port of each of the channels and an input port of the position detection circuit unit 300, corresponding to the each channel, and to compensate for intensities of the input current signals inputted to the input ports of the position detection circuit unit 300 by changing resistance values of at least one of the serial variable resistors 410 and the parallel variable resistors 420; and a coordinate calculation unit 500 configured to receive the four current signals divided and outputted based on the input current signals with the compensated intensities and to calculate coordinates of the gamma-ray interaction positions based on the received four current signals.

The scintillation crystals 100 preferably are a pixelated scintillator array in which a number of the scintillation crystals 100 are formed into a single layer in a form of a 29×29 quadrangle arrangement or a 28×28 quadrangle arrangement. Alternatively, an 8×8 quadrangle arrangement or a 16×16 quadrangle arrangement can be used as the pixelated scintillator array.

Furthermore, a number of the channels can include 64 channels of an 8×8 quadrangle arrangement or 256 channels of a 16×16 quadrangle arrangement. In addition, a number of the channels can include a variety of forms and a variety of channels.

The position detection circuit unit 300 preferably includes a resistive charge division circuit.

The compensation unit 400 preferably changes the resistance value of the parallel variable resistor 420, corresponding to the each channel, in accordance with Equation below.

$$R_p(i) = \frac{I_2}{I_1} R_s = \frac{O_{min}}{O(i) - O_{min}} R_s$$

(wherein, $R_p(i)$ is a resistance value of the parallel variable resistor 420 of an $i^{th}$ channel, $R_s$ is a resistance value of the serial variable resistor 410 of the $i^{th}$ channel, $I_2$ is an intensity of the current signal inputted to the input port of the position detection circuit unit 300, $I_1$ is an intensity of the current signal flowing through the parallel variable resistor 420, $O_{min}$ is a minimum uniformity value, and $O(i)$ is a uniformity value of the $i^{th}$ channel).

The compensation unit 400 preferably changes the resistance value of the parallel variable resistor 420 so that the intensity of the input current signal, corresponding to the each channel is uniformly compensated.

Furthermore, the compensation unit 400 can change the resistance value of the parallel variable resistor 420 with a resistance value of the serial variable resistor 410 fixed.

The parallel variable resistor 420 can change the resistance value using at least two resistors connected together in series.

Furthermore, the coordinate calculation unit 500 preferably calculates the gamma-ray interaction positions on the scintillation crystals 100 as plane coordinates in accordance with Equation below.

$$X = \frac{A+B}{A+B+C+D}, Y = \frac{A+D}{A+B+C+D}$$

(wherein, X is an axis corresponding to one direction on a scintillation crystal (100) plane, Y is an axis vertical to the one direction, A, B, C, and D are respective integral values of the intensities of the four current signals outputted by the position detection circuit unit 300, and A+B+C+D is an integral value of the sum signal of the four current signal intensities).

The compensation unit 400 preferably changes the resistance values of the parallel variable resistors 420 again in order to compensate for the input current signals again in accordance with Equation below.

$$R_{Pt}(i) = \frac{\alpha_1(i) \times O_{min}}{O(i) - \alpha_1(i) \times O_{min}} R_S$$

$$\alpha_1(i) = \frac{\text{Maximum integral value of primary compensation sum signal}}{\text{Integral value } (i) \text{ of primary compensation sum signal}}$$

(where, $Rp_2(i)$ s a re-changed resistance value of the parallel variable resistor 420 of an $i^{th}$ channel, $R_s$ is a resistance value of the serial variable resistor 410 of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals).

Meanwhile, to achieve the above objects, a method compensating for a gain non-uniformity of a PS-PMT according to another aspect of the present invention comprises a step (S100) of the PS-PMT 200 converting scintillation, generated by gamma rays incident to specific scintillation crystals 100, into electrons; a step (S110) of the PS-PMT 200 amplifying the electrons on a channel basis and outputting current signals through a number of respective channels; a step (S120) of a compensation unit 400 compensating for intensities of the input current signals, inputted to the input ports of a position detection circuit unit 300, by changing resistance values of at least one of serial variable resistors 410 and parallel variable resistors 420 using the serial variable resistor 410 and the parallel variable resistor 420 connected between an output port of each of the channels and an input port of the position detection circuit unit 300, corresponding to the each channel; a step (S130) of the position detection circuit unit 300 compressing the current signals with the compensated intensities into four current signals and dividedly outputting the four current signals in order to display gamma-ray interaction positions on the scintillation crystals 100 as a 2-dimensional energy distribution based on the current signals; and a step (S140) of the coordinate calculation unit 500 receiving the four divided and outputted current signals and calculating coordinates of the gamma-ray interaction positions based on the received four current signals.

The step (S120) of the compensation unit 400 compensating for the intensities of the input current signals preferably includes changing the resistance values of the parallel variable resistors 420 in order to uniform the intensities of the input current signals for the respective channels.

In the step (S120) of the compensation unit 400 compensating for the intensities of the input current signals, the resistance value of the serial variable resistor 410 preferably is fixed.

The step (S120) of the compensation unit 400 compensating for the intensities of the input current signals preferably includes changing the resistance value of the parallel variable resistor 420, corresponding to the each channel, in accordance with Equation below.

$$R_p(i) = \frac{I_2}{I_1} R_s = \frac{O_{min}}{O(i) - O_{min}} R_s$$

(where, $R_p(i)$ is a resistance value of the parallel variable resistor 420 of an $i^{th}$ channel, $R_s$ is a resistance value of the serial variable resistor 410 of the $i^{th}$ channel, $I_2$ is the intensity of the current signal inputted to the input port of the position detection circuit unit 300, $I_1$ is an intensity of the current signal flowing through the parallel variable resistor 420, $O_{min}$ is a minimum uniformity value, and $O(i)$ is a uniformity value of the $i^{th}$ channel).

The step (S120) of the compensation unit 400 compensating for the intensities of the input current signals preferably includes changing the resistance value of the parallel variable resistor 420 so that the intensity of the input current signal, corresponding to the each channel, is uniformly compensated for.

The step (S140) of the coordinate calculation unit 500 calculating the coordinates of the gamma-ray interaction positions preferably includes calculating the gamma-ray interaction positions on the scintillation crystals 100 as plane coordinates in accordance with Equation below.

$$X = \frac{A+B}{A+B+C+D}, Y = \frac{A+D}{A+B+C+D}$$

(where, X is an axis corresponding to one direction on a scintillation crystal (100) plane, Y is an axis vertical to the one direction, A, B, C, and D are respective integral values of the intensities of the four current signals outputted by the position detection circuit unit 300, and A+B+C+D is an integral value of the sum signal of the four current signal intensities).

The step (S120) of the compensation unit 400 compensating for the intensities of the input current signals preferably includes changing the resistance values of the parallel variable resistors 420 again in order to compensate for the input current signals again in accordance with Equation below.

$$R_{Pt}(i) = \frac{\alpha_1(i) \times O_{min}}{O(i) - \alpha_1(i) \times O_{min}} R_S$$

$$\alpha_1(i) = \frac{\text{Maximum integral value of primary compensation sum signal}}{\text{Integral value}(i) \text{ of primary compensation sum signal}}$$

(where, $Rp_2(i)$ is a re-changed resistance value of the parallel variable resistor 420 of an $i^{th}$ channel, $R_s$ is a resistance value of the serial variable resistor 410 of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals).

BRIEF DESCRIPTION OF THE DRAWINGS

Further objects and advantages of the invention can be more fully understood from the following detailed description taken in conjunction with the accompanying drawings in which.

DESCRIPTION OF REFERENCE NUMERALS OF PRINCIPAL ELEMENTS IN THE DRAWINGS

100: scintillation crystal
200: Multi-anode Position Sensitive Photomultiplier Tube (PS-PMT)
300: position detection circuit unit
310, A1, B1, C1, D1: output port
400: compensation unit
410: serial variable resistor
420: parallel variable resistor
430: equivalent resistor
500: coordinate calculation unit

DETAILED DESCRIPTION OF EMBODIMENTS

Some exemplary embodiments of the present invention will now be described in detail with reference to the accompanying drawings.

Embodiment

<Gain Non-Uniformity Compensation System>

Figure 1:
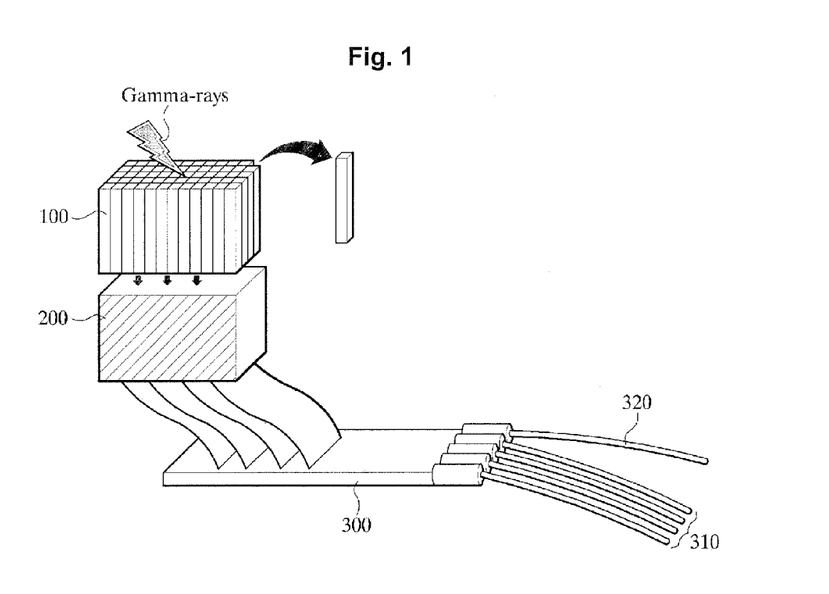
FIG. 1 is a perspective view showing a known gamma-ray interaction system to which a gain non-uniformity compensation system according to the present invention is applicable.

FIG. 1 is a perspective view showing a known gamma-ray interaction system to which a gain non-uniformity compensation system according to the present invention is applicable. As shown in FIG. 1, the gamma-ray interaction system includes a number of scintillation crystals 100 for absorbing gamma rays and generating scintillations, a Multi-anode Position Sensitive Photomultiplier Tube (PS-PMT) 200 for generating electrons using the scintillations, amplifying the electrons, and outputting current signals through a number of channels, and a position detection circuit unit 300 for compressing the current signals and outputting four current signals. Although not shown in FIG. 1, the gamma-ray interaction system further includes a coordinate calculation unit (not shown) for receiving the four current signals through the four output ports 310 of position detection circuit unit and calculating gamma-ray interaction positions on the basis of the four current signals. In addition, one dynode signal is further outputted through a dynode signal output port 320 and used as a trigger.

Figure 2:
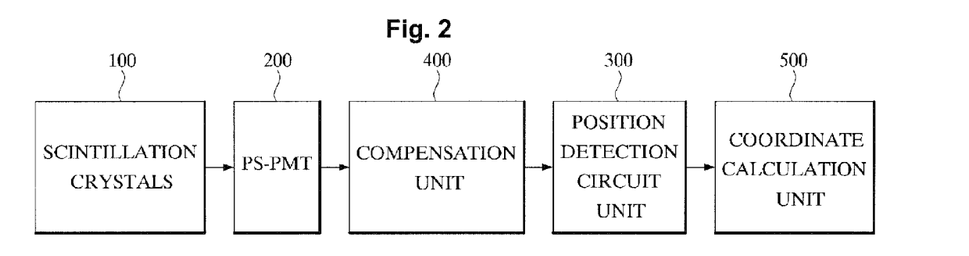
FIG. 2 is a block diagram showing the construction of the gain non-uniformity compensation system according to an embodiment of the present invention.

FIG. 2 is a block diagram showing the construction of the gain non-uniformity compensation system according to an embodiment of the present invention. As shown in FIG. 2, the gain non-uniformity compensation system according to the present invention includes the basic elements of the gamma-ray interaction system shown in FIG. 1 and further includes a compensation unit 400 for compensating for gain non-uniformity.

The operation of the gain non-uniformity compensation system is described in short below. Gamma rays absorbed by the scintillation crystals 100 radiate scintillations. The radiated scintillation energy generates electrons through the PS-PMT 200 and they are converted into amplified current signals. The amplified current signals are not outputted to the coordinate calculation unit 500 via the position detection circuit unit 300 without change, as in the prior art, but compensated for by the compensation unit 400. The compensated input current signals are uniformly inputted to the input ports of the position detection circuit unit 300, thereby compensating for the gain non-uniformity of the PS-PMT 200. Since the compensated input current signals are compressed into the four current signals through the position detection circuit unit 300 and then outputted to the coordinate calculation unit 500, accurate gamma ray interaction positions can be calculated. Here, the compensation of gain non-uniformity has an equivalent meaning as the uniformity of the intensities of the current signals inputted to the input ports of the position detection circuit unit 300.

The Multi-anode Position Sensitive Photomultiplier Tube (PS-PMT) 200 converts scintillation, generated by the gamma rays incident to specific scintillation crystals 100, into electrons, but amplifies current signals for a number of the respective channels, and outputs the amplified current signals. The PS-PMT 200 includes a number of the channels.

Here, 64 channels of an 8×8 quadrangle arrangement or 256 channels of a 16×16 quadrangle arrangement can be used as the channels of the PS-PMT 200. In some embodiments, the PS-PMT 200 having a variety of forms and various numbers of channels can be used.

In the present embodiment, a H8500 PS-PMT (by HAMAMATSU Co. Ltd.) was used. Alternatively, a H9500 PS-PMT may be used. The H8500 PS-PMT has an excellent packing density (i.e., effective area/external size) of 89% in the effective area of 49×49 mm$^2$. In the H8500 PS-PMT, a total of 64 anodes are arranged in the form of 8×8 anodes, one anode is 5.8×5.8 mm$^2$ in dimension, and a distance between the anodes is 6.08 mm.

The scintillation crystals 100 absorb gamma rays and generate scintillation. A pixelated scintillator array in which a number of the scintillation crystals 100, having a 29×29 quadrangle arrangement or a 28×28 quadrangle arrangement, are formed in a single layer can be used. The scintillation crystals 100 used in the present embodiment form a pixelated scintillator array aligned by a reflector. Here, the unit scintillation crystal 100 was 1.5×1.53×7 mm$^3$ in dimension and made of $L_{0.9}GSO$.

The position detection circuit unit 300 compresses the amplified and output current signals into four current signals in order to display gamma-ray interaction positions on the scintillation crystals 100 as a 2-dimensional energy distribution on the basis of the amplified and outputted current signals and outputs the four current signals. The position detection circuit unit 300 includes a resistive charge division circuit. For example, in the 8×8 form, the size of a circuit is inefficiently increased in order to individually process 64 signals output by 64 anodes. For this reason, the 64 signals are compressed and then outputted into four signals.

The compensation unit 400 includes a serial variable resistor 410 and a parallel variable resistor 420 connected between the output port of each of the channels and the input port of the position detection circuit unit 300, corresponding to each of the channels. The compensation unit 400 functions to compensate for the intensity of a current signal, inputted to the input port of the position detection circuit unit 300, by changing the resistance value of at least one of the serial variable resistor 410 and the parallel variable resistor 420. In the present embodiment, the input current signal was compensated for by changing only a resistance value of the parallel variable resistor 420 with the serial variable resistor 410 fixed to 20 kΩ.

Here, the input port of the position detection circuit unit 300 refers to the input port of the position detection circuit unit 300, which is equivalently connected to the serial variable resistor 410, that is, one of the elements of the compensation unit 400 of the corresponding channel.

The compensation unit 400 compensates for the intensity of the current signal inputted to the position detection circuit unit 300 by changing the resistance value of the parallel variable resistor 420, corresponding to each channel, in accordance with Equation 1 below:

$$R_p(i) = \frac{I_2}{I_1} R_s = \frac{O_{min}}{O(i) - O_{min}} R_s \quad \text{[Equation 1]}$$

(where, $R_p(i)$ is a resistance value of the parallel variable resistor 420 of an $i^{th}$ channel, $R_s$ is a resistance value of the serial variable resistor 410 of the $i^{th}$ channel, $I_2$ is an intensity of the current signal inputted to the input port of the position detection circuit unit 300, $I_1$ is an intensity of the current signal flowing through the parallel variable resistor 420, $O_{min}$ is a minimum uniformity value, and $O(i)$ is a uniformity value of the $i^{th}$ channel).

Furthermore, the compensation unit 400 compensates for the gain non-uniformity of the PS-PMT 200 by uniformly compensating for the intensities of input current signals corresponding to all the channels through a change of resistance values of the parallel variable resistors 420. The compensation for the gain non-uniformity of the compensation unit 400, that is, the uniformity compensation for the input current signals can be carried out by repeatedly performing secondary compensation and tertiary compensation other than the above primary compensation. Accordingly, further improved uniformity can be obtained.

Here, to obtain a desired resistance value, the parallel variable resistor 420 may be implemented by connecting at least two resistors in series.

The coordinate calculation unit 500 receives the four current signals, dividedly outputted on the basis of the input current signals with compensated intensities, and calculates the coordinates of gamma-ray interaction positions based on the received four current signals. The coordinate calculation unit 500 calculates plane coordinates so that they correspond to an 8×8 quadrangle arrangement or a 16×16 quadrangle arrangement. Accordingly, the coordinate calculation unit 500 can determine the degree of gain non-uniformity and changes the changed resistance value of the parallel variable resistor 420 again based on a result of the determination, thereby being capable of further improving gain non-uniformity.

The coordinate calculation unit 500 can determine the degree of gain non-uniformity by calculating gamma-ray interaction positions on the scintillation crystals 100 using plane coordinates X, Y in accordance with the following equation 2. Furthermore, the compensation unit 400 uses the data to compensate for the gain non-uniformity of the PS-PMT 200 again.

$$X = \frac{A+B}{A+B+C+D}, Y = \frac{A+D}{A+B+C+D} \quad \text{[Equation 2]}$$

(where, X is an axis corresponding to one direction on a scintillation crystal (100) plane, Y is an axis vertical to the one direction, A, B, C, and D are respective integral values of the intensities of the four current signals output by the position detection circuit unit 300, and A+B+C+D is an integral value of the sum signal of the four current signal intensities).

The result of the primary compensation, performed by the compensation unit 400 and acquired through the coordinate calculation unit 500, is used for re-compensation. More particularly, the compensation unit 400 changes the changed resistance value of the parallel variable resistor 420 again in order to compensate for the input current signals again in accordance with the following equation 3. To further improve the gain non-uniformity of the PS-PMT 200, such compensation can be repeatedly performed.

$$R_{Pt}(i) = \frac{\alpha_1(i) \times O_{min}}{O(i) - \alpha_1(i) \times O_{min}} R_s \quad \text{[Equation 3]}$$

$$\alpha_1(i) = \frac{\text{Maximum integral value of primary compensation sum signal}}{\text{Integral value}(i) \text{ of primary compensation sum signal}}$$

(where, $Rp_2(i)$ is a re-changed resistance value of the parallel variable resistor 420 of an $i^{th}$ channel, $R_s$ is a resistance value of the serial variable resistor 410 of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals).

In tertiary compensation, the compensation unit 400 compensates for the gain non-uniformity of the PS-PMT 200 by changing the resistance value of the parallel variable resistor 420 again in accordance with the following equation 4.

$$R_{P3}(i) = \frac{\alpha_1(i) \times \alpha_2(i) \times O_{min}}{O(i) - \alpha_1(i) \times \alpha_2(i) \times O_{min}} R_s \quad \text{[Equation 4]}$$

$$\alpha_2(i) = \frac{\text{Maximum integral value of secondary compensation sum signal}}{\text{Integral value}(i) \text{ of secondary compensation sum signal}}$$

(where, $Rp_3(i)$ is a re-changed resistance value of the parallel variable resistor 420 of an $i^{th}$ channel, $R_s$ is a resistance value of the serial variable resistor 410 of the $i^{th}$ channel, $O_{min}$ is a minimum uniformity value, $O(i)$ is a uniformity value of the $i^{th}$ channel, the integral value (i) of the secondary compensation sum signal is an integral value of a second sum signal of the four current signal intensities corresponding to the $i^{th}$ channel, and the maximum integral value of the secondary compensation sum signal is a maximum integral value of the second sum signal of the intensities of the four current signals).

Here, the output gain of the PS-PMT 200 is a value proportional to input current signals inputted to the input ports of the position detection circuit unit 300 for every channel. Thus, assuming that the uniformity value is 100, the output gain of the PS-PMT 200 can be calculated into the ratio of 1 mA and then used.

Furthermore, the input current signals inputted to the input ports of the position detection circuit unit 300 for every channel are outputted through the four output ports 310. The integral value of the sum signal in which the sum of the four current signal intensities is one signal becomes a gain after the primary compensation or the secondary compensation for the gain non-uniformity.

Figure 3:
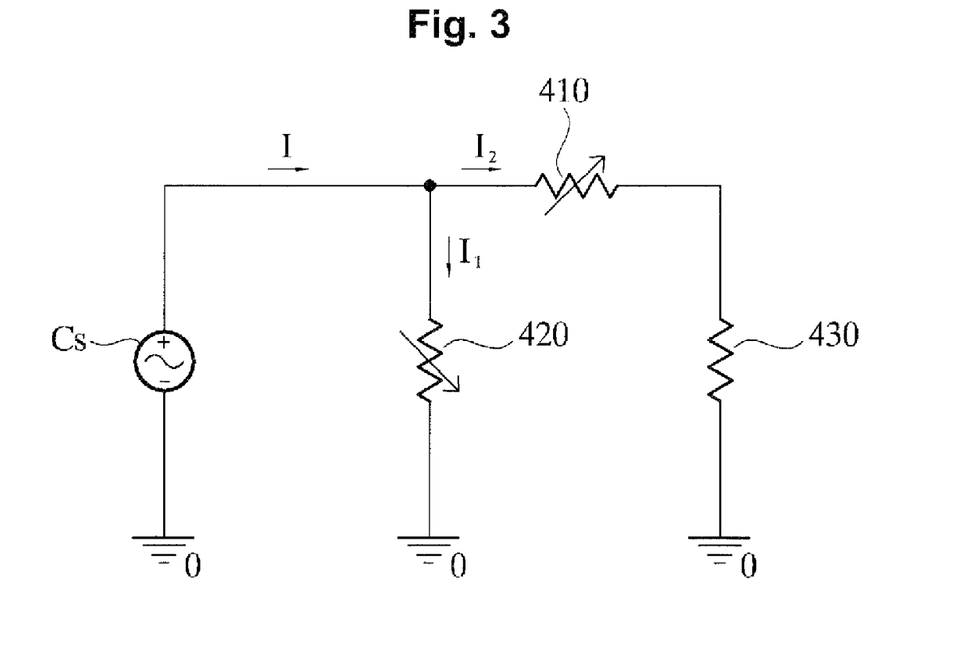
FIG. 3 is a circuit diagram schematically showing the concept of the gain non-uniformity compensation system according to the present invention.

FIG. 3 is a circuit diagram schematically showing the concept of the gain non-uniformity compensation system of the PS-PMT 200 according to the present invention. As shown in FIG. 3, each of the channels of the PS-PMT 200 is a current source C, and the intensity I of a current signal amplified and outputted from the current source flows through the circuit.

The serial variable resistor 410 (i.e., one of the elements of the compensation unit 400) is in series connected to the equivalent resistor 430 of the position detection circuit unit 300, and an input current signal $I_2$ inputted to the input ports of the position detection circuit unit 300 flows through the serial variable resistor 410.

Furthermore, the parallel variable resistor 420 is in parallel connected to the serial variable resistor 410 and the equivalent resistor 430. A current signal $I_1$ flows through the parallel variable resistor 420.

Consequently, the gain non-uniformity compensation system of the present invention compensates for the gain non-uniformity of the PS-PMT 200 by uniformly compensating for the input current signal $I_2$, inputted to the equivalent resistor 430, for every channel. In this case, the size of the serial variable resistor 410 preferably is much larger than the size of the equivalent resistor 430 (i.e., the input impedance of the resistive charge division circuit) to prevent the function of the resistive charge division circuit from being affected (a different of about 100 to 300 times).

Figure 4:
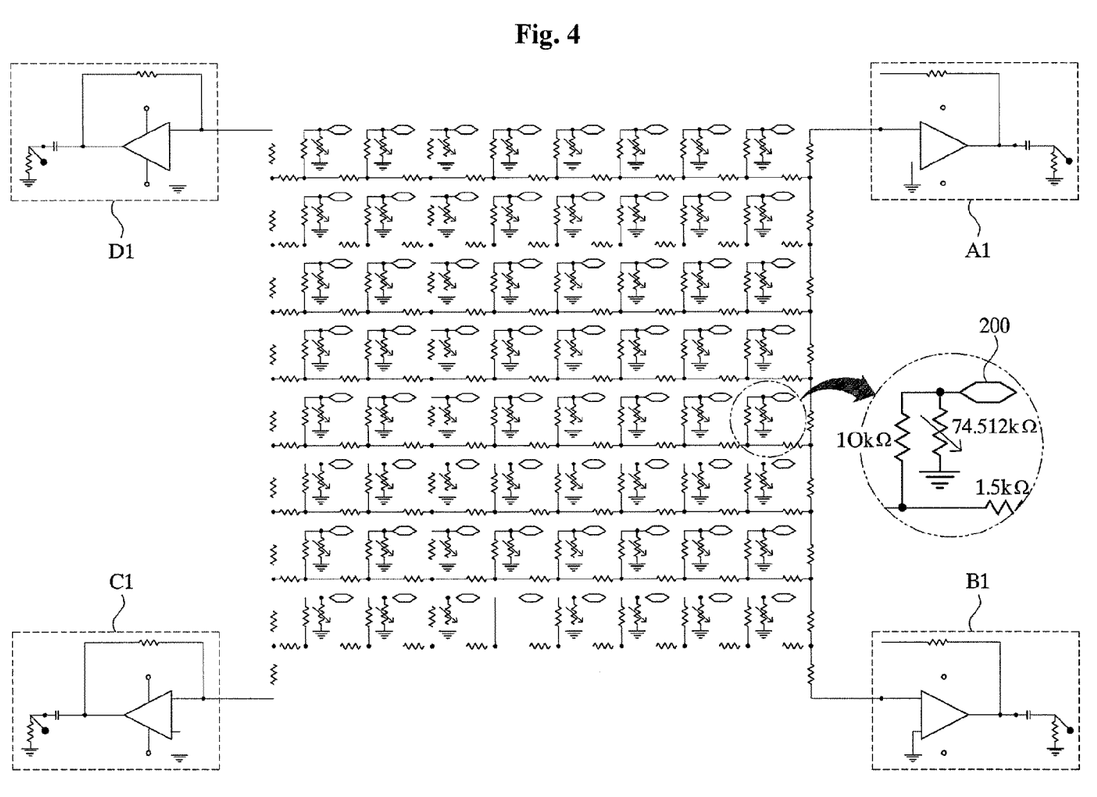
FIG. 4 a circuit diagram and a partial enlarged view, showing the gain non-uniformity compensation system of a Multi-anode Position Sensitive Photomultiplier Tube (PS-PMT) according to an embodiment of the present invention.

FIG. 4 is a circuit diagram and a partial enlarged view, showing the gain non-uniformity compensation system of the Multi-anode Position Sensitive Photomultiplier Tube (PS-PMT) according to an embodiment of the present invention. As shown in FIG. 4, the gain non-uniformity compensation system includes the position detection circuit unit 300 having four output ports A1, B1, C1, and D1, the PS-PMT 200 having 64 channels, and serial resistors each having 20 kΩ and parallel resistors each having its own value after compensation between a corresponding channel and the position detection circuit unit 300 as shown in the partial enlarged view.

Figure 5:
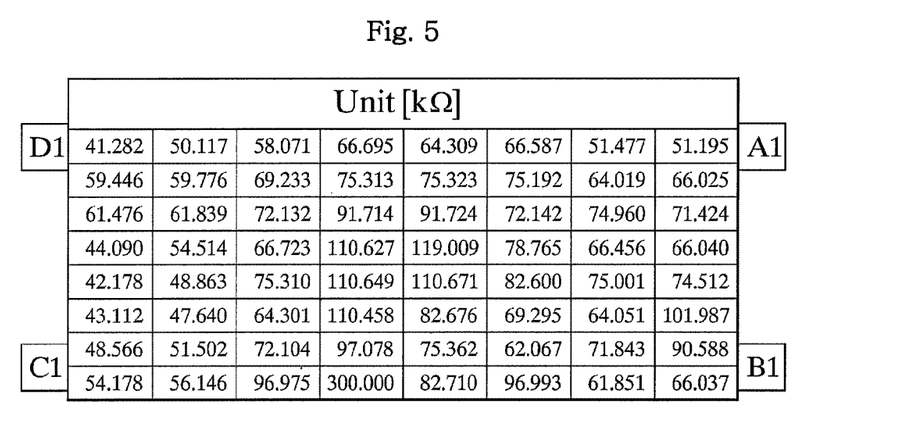
FIG. 5 is a diagram showing resistance values of parallel variable resistors, compensated for in response to the respective channels of the PS-PMT in the gain non-uniformity compensation system of FIG. 4, in the form of a table.

FIG. 5 is a diagram showing resistance values of parallel variable resistors, compensated for in response to the respective channels of the PS-PMT in the gain non-uniformity compensation system of FIG. 4, in the form of a table. In FIG. 5, the resistance values of the parallel variable resistors 420 (i.e., one of the elements of the gain non-uniformity compensation system according to the present invention) are values compensated for on the basis of the uniformity value of each channel using the H8500 PS-PMT (by HAMAMATSU Co. Ltd.). The 64 channels are illustrated to correspond to respective gamma-ray interaction positions P1 to P64 of the scintillation crystals on the basis of the four current signals of A, B, C, and D outputted by the four output ports A1, B1, C1, and D1, respectively.

Figure 6A:
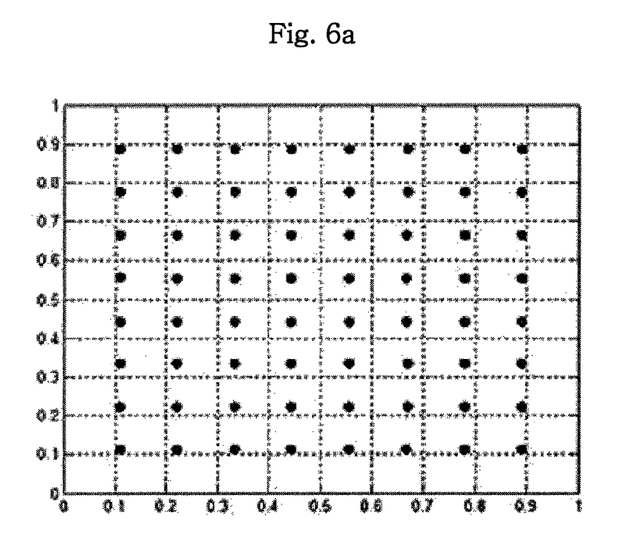
FIG. 6A is a diagram showing a gamma-ray interaction position map in which virtual gamma-ray interaction positions are displayed as dots using the virtual gamma-ray interaction positions as relative positions in order to apply the gain non-uniformity compensation system according to the present invention.
Figure 6B:
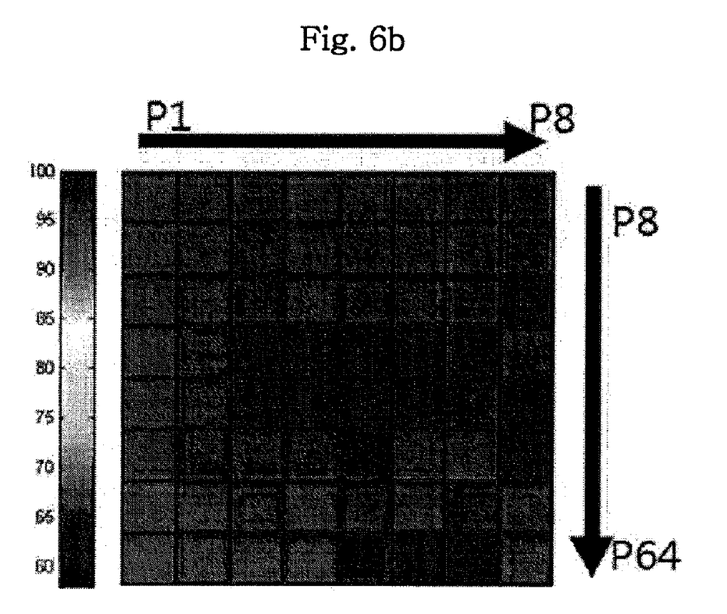
FIG. 6B is a diagram showing a uniformity map after compensated for using the gain non-uniformity compensation system according to the present invention.

FIG. 6A is a diagram showing a gamma-ray interaction position map in which virtual gamma-ray interaction positions (i.e., relative 2-dimensional coordinate positions) are displayed as dots in order to apply the gain non-uniformity compensation system according to the present invention. FIG. 6B is a diagram showing a uniformity map after compensated for using the gain non-uniformity compensation system of the present invention. From FIG. 6B, it can be seen that the uniformity map having a uniform gain can be obtained by applying the gain non-uniformity compensation system of the present invention in response to the uniformity of the gamma-ray interaction positions shown in FIG. 6A.

In the uniformity map shown in FIG. 6B, the uniformity is displayed, assuming that 100 is the highest value in response to the channels P1 to P64. FIG. 6B shows the uniformity map after experiencing the tertiary compensation. In FIG. 6B, the uniformity average and standard deviation is 96.8±1.3 (1.3%).

Figure 7A:
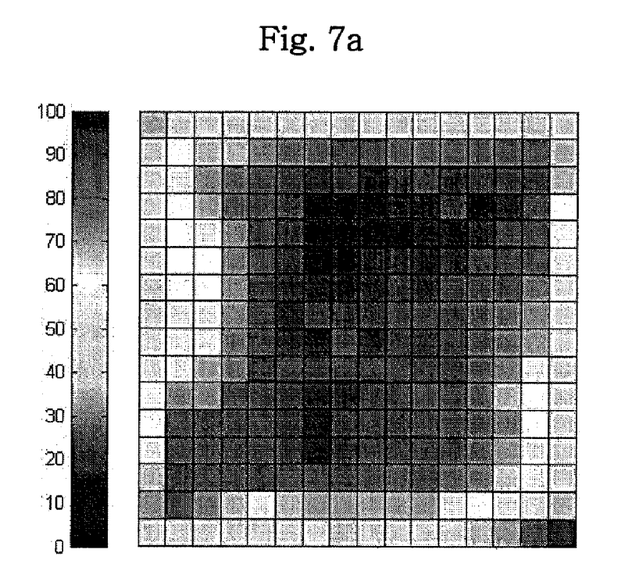
FIG. 7A is a diagram showing the uniformity of each of channels (256 channels of a 16×16 quadrangle arrangement) in an H9500 PS-PMT (by HAMAMATSU Co. Ltd.) in the form of a uniformity map, prior to the use of the gain non-uniformity compensation system according to the present invention.
Figure 7B:
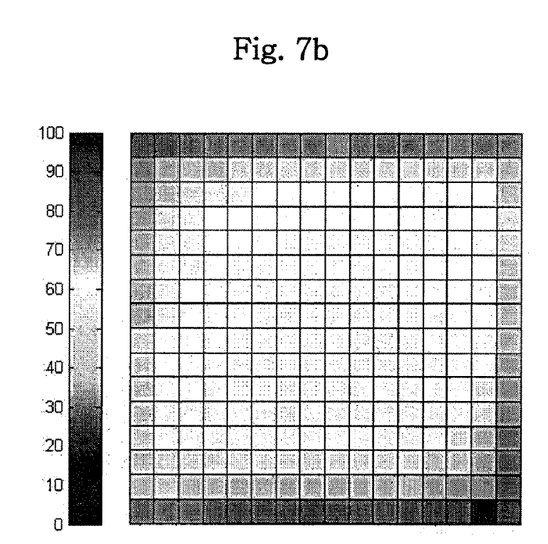
FIGS. 7B to 7D are diagrams sequentially showing uniformity maps after primary compensation, secondary compensation, and tertiary compensation performed by applying the gain non-uniformity compensation system of the present invention to the H9500 PS-PMT.
Figure 7C:
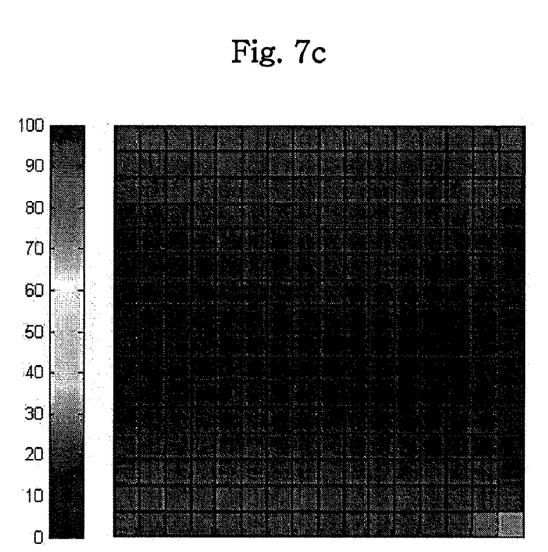
Figure 7D:
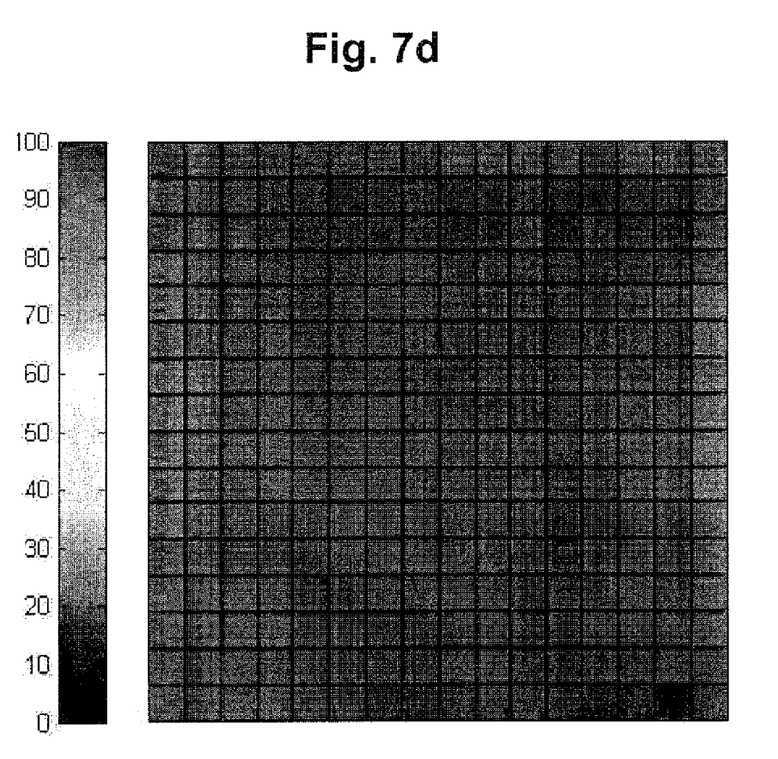

FIG. 7A is a diagram showing the uniformity of each of channels (256 channels of a 16×16 quadrangle arrangement) in the H9500 PS-PMT (by HAMAMATSU Co. Ltd.) in the form of a uniformity map, prior to the use of the gain non-uniformity compensation system according to the present invention. FIGS. 7B to 7D are diagrams sequentially showing uniformity maps after the primary compensation, the secondary compensation, and the tertiary compensation performed by applying the gain non-uniformity compensation system of the present invention to the H9500 PS-PMT. From FIGS. 7B to 7D, it can be seen that gain non-uniformity can be further improved by applying the gain non-uniformity compensation system of the present invention several times.

Accordingly, in order to further increase gain uniformity, the above compensation can be performed in the same way even after the tertiary compensation.

<Method of Compensating for Gain Non-Uniformity>

Figure 8:
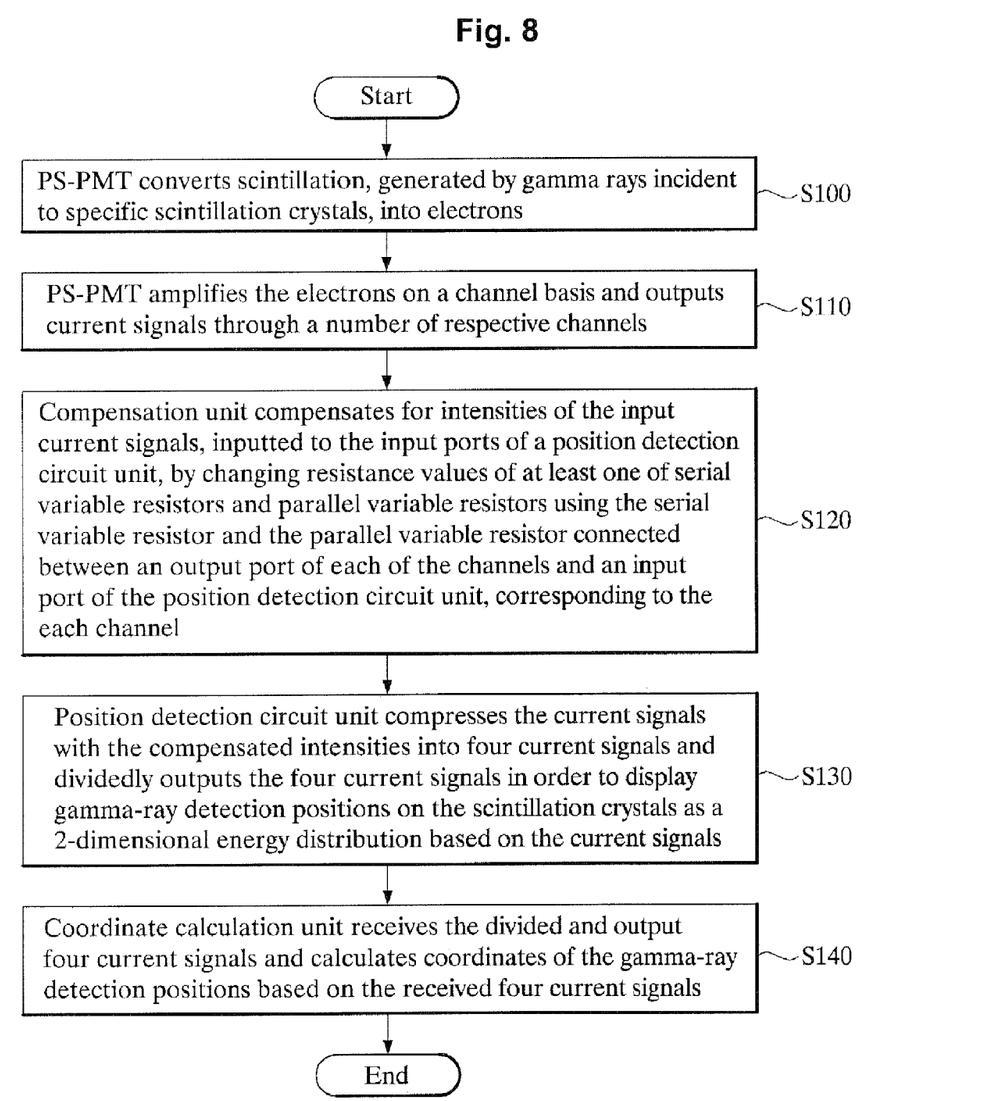
FIG. 8 is a flowchart sequentially illustrating a method of compensating for the gain non-uniformity of the PS-PMT according to an embodiment of the present invention.

FIG. 8 is a flowchart illustrating a method of compensating for the gain non-uniformity of the PS-PMT according to an embodiment of the present invention. Referring to FIG. 8, the PS-PMT 200 converts scintillation, generated by gamma rays incident to specific scintillation crystals 100, into electrons at step S100.

The PS-PMT 200 amplifies the electrons and outputs current signals through a number of the channels at step S110.

The compensation unit 400 compensates for the intensity of the current signal inputted to the input ports of the position detection circuit unit 300, from among the amplified and outputted current signals, by changing the resistance value of at least one of the serial variable resistors 410 and the parallel variable resistors 420 each connected between the output port of each of the channels and the input ports of the position detection circuit unit 300, corresponding to each of the channels, at step S120.

In the step (S120) of the compensation unit 400 compensating for the intensity of the input current signal, the resistance value of the parallel variable resistor 420 is changed in order to uniform the intensities of the input current signals for every channel. Furthermore, the resistance value of the serial variable resistor 410 is fixed, and only the resistance value of the parallel variable resistor 420 is changed.

Further, in the step (S120) of the compensation unit 400 compensating for the intensity of the input current signal, compensation is carried out by changing the resistance value of the parallel variable resistor 420 so that the intensity of the input current signal corresponding to each channel is uniformly compensated for.

Furthermore, in the step (S120) of the compensation unit 400 compensating for the intensity of the input current signal, the intensity of the input current signal, corresponding to each channel is compensated for by changing the resistance value of the parallel variable resistor 420 in accordance with the following equation.

$$R_p(i) = \frac{I_2}{I_1}R_s = \frac{O_{min}}{O(i) - O_{min}}R_s$$

(where, $R_p(i)$ is a resistance value of the parallel variable resistor 420 of an $i^{th}$ channel, $R_s$ is a resistance value of the serial variable resistor 410 of the $i^{th}$ channel, $I_2$ is the intensity of the current signal inputted to the input port of the position detection circuit unit 300, $I_1$ is the intensity of the current signal flowing through the parallel variable resistor 420, $O_{min}$ is a minimum uniformity value, and $O(i)$ is a uniformity value of the $i^{th}$ channel).

The position detection circuit unit 300 compresses the input current signals in order to display gamma-ray interaction positions on the scintillation crystals 100 as a 2-dimensional energy distribution on the basis of the input current signals with compensated intensities and dividedly outputs the currents signals through the four current signals at step S130.

Next, the coordinate calculation unit 500 receives the four dividedly outputted current signals, and calculates the coordinates of gamma-ray interaction positions based on the four received current signals at step S140. As described above, the method of compensating for the gain non-uniformity of the PS-PMT is performed.

In the step (S140) of the coordinate calculation unit 500 calculating the coordinates of the gamma-ray interaction positions, plane coordinates of the gamma-ray interaction positions on the scintillation crystals 100 are calculated in accordance with the following equation.

$$X = \frac{A+B}{A+B+C+D}, Y = \frac{A+D}{A+B+C+D}$$

(where, X is an axis corresponding to one direction on a scintillation crystal (100) plane, Y is an axis vertical to the one direction, A, B, C, and D are respective integral values of the intensities of the four current signals outputted by the position detection circuit unit 300, and A+B+C+D is an integral value of the sum signal of the four current signal intensities).

To further increase the uniformity, compensation can be performed again on the basis of the resulting data after the primary compensation. In this case, in the step (S120) of the compensation unit 400 compensating for the intensity of the input current signal, to perform the re-compensation for the input current signals in accordance with the following equation, the resistance value of the parallel variable resistor 420 is changed again. Of course, after the secondary compensation, tertiary compensation may be performed. Through such repetitive compensations, the uniformity can be increased.

$$R_{P2}(i) = \frac{\alpha_1(i) \times O_{min}}{O(i) - \alpha_1(i) \times O_{min}} R_S$$

$$\alpha_1(i) = \frac{\text{Maximum integral value of primary compensation sum signal}}{\text{Integral value}(i) \text{ of primary compensation sum signal}}$$

(where, $R_{P2}(i)$ is a re-changed resistance value of the parallel variable resistor 420 of an $i^{th}$ channel, $R_s$ is a resistance value of the serial variable resistor 410 of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals).

As described above, in the embodiments of the present invention, the compensation unit for changing resistance is used. Accordingly, there is an advantage in that the gain non-uniformity of each of the anodes of the PS-PMT can be compensated for.

Furthermore, the gain non-uniformity of each of the anodes of the PS-PMT is compensated for by changing resistance values of the variable resistances of the compensation unit. Accordingly, there is an advantage in that the interaction positions of gamma rays can be calculated more precisely.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A system for compensating for a gain non-uniformity of Multi-anode Position Sensitive Photomultiplier Tube (PS-PMT), the system comprising:
the PS-PMT (200) configured to convert scintillation, generated by gamma rays incident to specific scintillation crystals (100), into electrons, amplify the electrons on a channel basis, and output current signals through a number of respective channels;
a position detection circuit unit (300) configured to compress the current signals into four current signals and dividedly output the four current signals in order to display gamma-ray interaction positions on the scintillation crystals (100) in a form of a 2-dimensional energy distribution based on the current signals;
a compensation unit (400) configured to comprise a serial variable resistor (410) and a parallel variable resistor (420), connected between an output port of each of the channels and an input port of the position detection circuit unit (300), corresponding to the each channel, and to compensate for intensities of the input current signals inputted to the input ports of the position detection circuit unit (300) by changing resistance values of at least one of the serial variable resistors (410) and the parallel variable resistors (420); and
a coordinate calculation unit (500) configured to receive the divided and outputted four current signals based on the input current signals with the compensated intensities and to calculate coordinates of the gamma-ray interaction positions based on the received four current signals.

2. The system as claimed in claim 1, wherein the scintillation crystals (100) are a pixelated scintillator array in which a number of the scintillation crystals (100) are formed into a single layer in a form of a 29×29 quadrangle arrangement or a 28×28 quadrangle arrangement.

3. The system as claimed in claim 1, wherein a number of the channels include 64 channels of an 8×8 quadrangle arrangement or 256 channels of a 16×16 quadrangle arrangement.

4. The system as claimed in claim 1, wherein the position detection circuit unit (300) includes a resistive charge division circuit.

5. The system as claimed in claim 1, wherein the compensation unit (400) changes the resistance value of the parallel variable resistor (420), corresponding to the each channel, in accordance with the following equation:

$$R_p(i) = \frac{I_2}{I_1} R_s = \frac{O_{min}}{O(i) - O_{min}} R_S$$

wherein $R_p(i)$ is the resistance value of the parallel variable resistor (420) of an $i^{th}$ channel, $R_s$ is a resistance value of the serial variable resistor (410) of the $i^{th}$ channel, $I_2$ is the intensity of the current signal inputted to the input port of the position detection circuit unit (300), $I_1$ is the intensity of the current signal flowing through the parallel variable resistor (420), $O_{min}$ is a minimum uniformity value, and $O(i)$ is a uniformity value of the $i^{th}$ channel.

6. The system as claimed in claim 1, wherein the compensation unit (400) changes the resistance value of the parallel variable resistor (420) so that the intensity of the input current signal is uniformly compensated for in response to the each channel.

7. The system as claimed in claim 1, wherein the compensation unit (400) changes the resistance value of the parallel variable resistor (420) with a resistance value of the serial variable resistor (410) fixed.

8. The system as claimed in claim 1, wherein the parallel variable resistor (420) changes the resistance value using at least two resistors connected together in series.

9. The system as claimed in claim 1, wherein the coordinate calculation unit (500) calculates the gamma-ray interaction positions on the scintillation crystals (100) as plane coordinates in accordance with the following equation:

$$X = \frac{A+B}{A+B+C+D}, Y = \frac{A+D}{A+B+C+D}$$

wherein X is an axis corresponding to one direction on a scintillation crystal (100) plane, Y is an axis vertical to the one direction, A, B, C, and D are respective integral values of the intensities of the four current signals output by the position detection circuit unit (300), and A+B+C+D is an integral value of the sum signal of the four current signal intensities.

10. The system as claimed in claim 9, wherein the compensation unit (400) changes the resistance values of the parallel variable resistors (420) again in order to compensate for the input current signals again in accordance with the following equation:

$$R_{P_t}(i) = \frac{\alpha_1(i) \times O_{min}}{O(i) - \alpha_1(i) \times O_{min}} R_S$$

$$\alpha_1(i) = \frac{\text{Maximum integral value of primary compensation sum signal}}{\text{Integral value}(i) \text{ of primary compensation sum signal}}$$

wherein $R_{p_2}(i)$ is a re-changed resistance value of the parallel variable resistor (420) of an $i^{th}$ channel, $R_s$ is a resistance value of the serial variable resistor (410) of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals.

11. A method of compensating for a gain non-uniformity of a PS-PMT, the method comprising:
a step (S100) of the PS-PMT (200) converting scintillation, generated by gamma rays incident to specific scintillation crystals (100), into electrons;
a step (S110) of the PS-PMT (200) amplifying the electrons on a channel basis and outputting current signals through a number of respective channels;

a step (S120) of a compensation unit (400) compensating for intensities of the input current signals, inputted to the input ports of a position detection circuit unit (300), by changing resistance values of at least one of serial variable resistors (410) and parallel variable resistors (420) using the serial variable resistor (410) and the parallel variable resistor (420) connected between an output port of each of the channels and an input port of the position detection circuit unit (300), corresponding to the each channel;

a step (S130) of the position detection circuit unit (300) compressing the current signals with the compensated intensities into four current signals and dividedly outputting the four current signals in order to display gamma-ray interaction positions on the scintillation crystals (100) as a 2-dimensional energy distribution based on the current signals; and a step (S140) of the coordinate calculation unit (500) receiving the divided and outputted four current signals and calculating coordinates of the gamma-ray interaction positions based on the received four current signals.

12. The method as claimed in claim 11, wherein the step (S120) of the compensation unit (400) compensating for the intensities of the input current signals includes changing the resistance values of the parallel variable resistors (420) in order to uniform the intensities of the input current signals for the respective channels.

13. The method as claimed in claim 12, wherein in the step (S120) of the compensation unit (400) compensating for the intensities of the input current signals, the resistance value of the serial variable resistor (410) is fixed.

14. The method as claimed in claim 11, wherein the step (S120) of the compensation unit (400) compensating for the intensities of the input current signals includes changing the resistance value of the parallel variable resistor (420), corresponding to the each channel, in accordance with the following equation:

$$R_P(i) = \frac{I_2}{I_1} R_s = \frac{O_{min}}{O(i) - O_{min}} R_s$$

wherein $R_p(i)$ is the resistance value of the parallel variable resistor (420) of an $i^{th}$ channel, $R_s$ is a resistance value of the serial variable resistor (410) of the $i^{th}$ channel, $I_2$ is the intensity of the current signal inputted to the input port of the position detection circuit unit (300), $I_1$ is the intensity of the current signal flowing through the parallel variable resistor (420), $O_{min}$ is a minimum uniformity value, and $O(i)$ is a uniformity value of the $i^{th}$ channel.

15. The method as claimed in claim 11, wherein the step (S120) of the compensation unit (400) compensating for the intensities of the input current signals includes changing the resistance value of the parallel variable resistor (420) so that the intensity of the input current signal, corresponding to the each channel, is uniformly compensated for.

16. The method as claimed in claim 11, wherein the step (S140) of the coordinate calculation unit (500) calculating the coordinates of the gamma-ray interaction positions includes calculating the gamma-ray interaction positions on the scintillation crystals (100) as plane coordinates in accordance with the following equation:

$$X = \frac{A+B}{A+B+C+D}, Y = \frac{A+D}{A+B+C+D}$$

wherein X is an axis corresponding to one direction on a scintillation crystal (100) plane, Y is an axis vertical to the one direction, A, B, C, and D are respective integral values of the intensities of the four current signals output by the position detection circuit unit (300), and A+B+C+D is an integral value of the sum signal of the four current signal intensities.

17. The method as claimed in claim 16, wherein the step (S120) of the compensation unit (400) compensating for the intensities of the input current signals includes changing the resistance values of the parallel variable resistors (420) again in order to compensate for the input current signals again in accordance with the following equation:

$$R_{P_t}(i) = \frac{\alpha_1(i) \times O_{min}}{O(i) - \alpha_1(i) \times O_{min}} R_S$$

$$\alpha_1(i) = \frac{\text{Maximum integral value of primary compensation sum signal}}{\text{Integral value}(i) \text{ of primary compensation sum signal}}$$

where $R_{p_2}(i)$ is a re-changed resistance value of the parallel variable resistor (420) of an $i^{th}$ channel, $R_s$ is a resistance value of the serial variable resistor (410) of the $i^{th}$ channel, $O_{min}$ is a minimum uniformity value, $O(i)$ is a uniformity value of the $i^{th}$ channel, the integral value (i) of the primary compensation sum signal is an integral value of a first sum signal of the four current signal intensities corresponding to the $i^{th}$ channel, and the maximum integral value of the primary compensation sum signal is a maximum integral value of the first sum signal of the intensities of the four current signals.

* * * * *